United States Patent [19]

Ho

[11] Patent Number: 4,767,015
[45] Date of Patent: Aug. 30, 1988

[54] ANTI-SLIP PLASTIC GLASS

[75] Inventor: Alexander Ho, Taipei, Taiwan

[73] Assignee: Culver Glassware Co., Inc., Rahway, N.J.

[21] Appl. No.: 75,149

[22] Filed: Jul. 20, 1987

[30] Foreign Application Priority Data

Aug. 11, 1986 [TW] Taiwan ............................. 75207502

[51] Int. Cl.⁴ ....................... A47G 19/22; B65D 25/24
[52] U.S. Cl. ............................... 215/100 R; 215/1 C; 220/69; 220/70.1; 229/1.5 B; 248/346.1; 248/359.1
[58] Field of Search ................ 215/100 R, 1 C, 100.5; 220/85 H, 69, 70.1; 248/346.1, 359.1; 229/1.5 B, 1.5 H

[56] References Cited

U.S. PATENT DOCUMENTS

| | | | |
|---|---|---|---|
| 251,250 | 12/1881 | Korf, Jr. ........................ | 215/100 R |
| 282,244 | 7/1883 | Vernon ........................ | 248/359.1 X |
| 596,194 | 12/1897 | Wales et al. ..................... | 215/100 R |
| 845,777 | 3/1907 | Grossman ........................ | 215/100 R |
| 2,018,271 | 10/1935 | Lewis ................................... | 220/69 |
| 2,517,248 | 8/1950 | Semeyn ................................ | 220/69 |

FOREIGN PATENT DOCUMENTS

| | | | |
|---|---|---|---|
| 1203117 | 1/1960 | France ............................. | 220/69 |
| 755 | 2/1880 | United Kingdom ............ | 215/100 R |
| 895685 | 5/1962 | United Kingdom ................. | 220/69 |

*Primary Examiner*—Stephen Marcus
*Assistant Examiner*—Sue A. Weaver
*Attorney, Agent, or Firm*—Lerner, David, Littenberg, Krumholz & Mentlik

[57] ABSTRACT

An anti-slip plastic glass is disclosed including a plastic glass with a groove in its base, a ring base disposed within the groove and including a plurality of circumferential slots, and an anti-slip band between the groove and the ring base, and including a plurality of flanges and notches. In this manner contact between the anti-slip band and a table or other surface is maintained to prevent the glass from slipping and thus prevent damage to the table or other surface thereby.

9 Claims, 4 Drawing Sheets

ANTI-SLIP PLASTIC GLASS

FIELD OF THE INVENTION

The present invention relates to anti-slip containers, and more particularly to anti-slip plastic glasses. Still more particularly, the present invention relates to anti-slip plastic glasses which include anti-slip structures in their base.

BACKGROUND OF THE INVENTION

The use of anti-slip structures enables plastic glasses to remain stationary on a table or other surface in a manner such that the glass will not slide or slip away. This, in turn, prevents desktops and the like from being scratched from the plastic glass base.

In the past, neither containers made from glass nor plastic had anti-slip structures on their bases. However, the furniture, e.g., tables, desks, cabinets, etc., used in average families is usually of a relatively high quality. Furthermore, the surfaces of this furniture are generally smooth and fine, and proper maintenance is a necessity. Therefore, conventional glasses which have no anti-slip structure may slide or slip on these surfaces, or even scratch them. In fact, in some instances, such as where water exists between these glasses and the surface, the friction between them becomes almost negligible, and slipping of these glasses is thus very likely to occur. A slight displacement of these glasses may only result in slight inconveniences. However, if a glass were to slip over to the table edge, then it might well fall and cause serious problems. For example, should the glass contain any liquid, it could then pour out and damage the floor or carpet. This is undoubtedly a bothersome problem.

Recently, anti-slip plastic glasses have therefore become available in an attempt to alleviate these problems. For example, such an anti-slip glass is shown in FIG. 4 hereof. Such anti-slip structures, however, may be easily disconnected from the glass base, as can be seen in FIG. 4. These anti-slip structures have thus been formed by the engagement of an anti-slip strip, 5, onto a groove in the base of the glass before cooling the extruded mold of the plastic glass. After cooling, the anti-slip strip, 5, will thus become embedded into the groove in the glass base. However, the anti-slip strip, 5, can then become loose rather easily, such as during washing, especially when an ultra-sonic faucet is installed, as is so in a great number of families. Ultra-sonic waves can thus affect the structure of the anti-slip strip, 5, so that it can then rather easily separate from the glass. As a result, the actual performance of such an anti-slip strip, 5, is far less than desired.

SUMMARY OF THE INVENTION

In accordance with the present invention, these and other deficiencies in the prior art have been overcome by the invention of an anti-slip container such as an anti-slip plastic glass. Thus, in accordance, with this invention, an anti-slip structure in the base of a plastic glass is provided, and more particularly, an anti-slip structure for plastic glass bases which will not become loose or separated therefrom.

This has been accomplished by the invention of an anti-slip container including a base portion for supporting the container on a surface, groove means disposed in the base portion, a support member having a shape corresponding to the shape of the groove means so that the support member can be disposed within the groove means, and an anti-slip member having a shape corresponding to the shape of the support member and having a size such that the anti-slip member can be contained between the support member and the groove means, the support member including aperture means and retention means at least partially blocking the aperture means, so that at least a portion of the anti-slip member can project through the aperture means when the anti-slip member is retained between the support member and the groove means while the retention means can prevent removal of the anti-slip member from the support member therethrough.

In accordance with one embodiment of the anti-slip container of the present invention, the groove means, the support member, and the anti-slip member each has a generally annular configuration. In a preferred embodiment the container has a cup-shaped configuration.

In accordance with another embodiment of the anti-slip container of the present invention, the aperture means comprises a plurality of circumferential slots, and in a preferred embodiment the retention means comprises a plurality of bridging members separating the plurality of circumferential slots from each other. In a most preferred embodiment the anti-slip member includes a plurality of notches corresponding in location to the location of the plurality of bridging members.

In accordance with another embodiment of the anti-slip container of the present invention the container is a plastic container. In a preferred embodiment the anti-slip member and the support member are engaged to the groove means in the glass by means of the application of ultra-sonic waves thereto. In accordance with another embodiment, the anti-slip member comprises a polyvinyl chloride strip.

DETAILED DESCRIPTION

Figure 1:
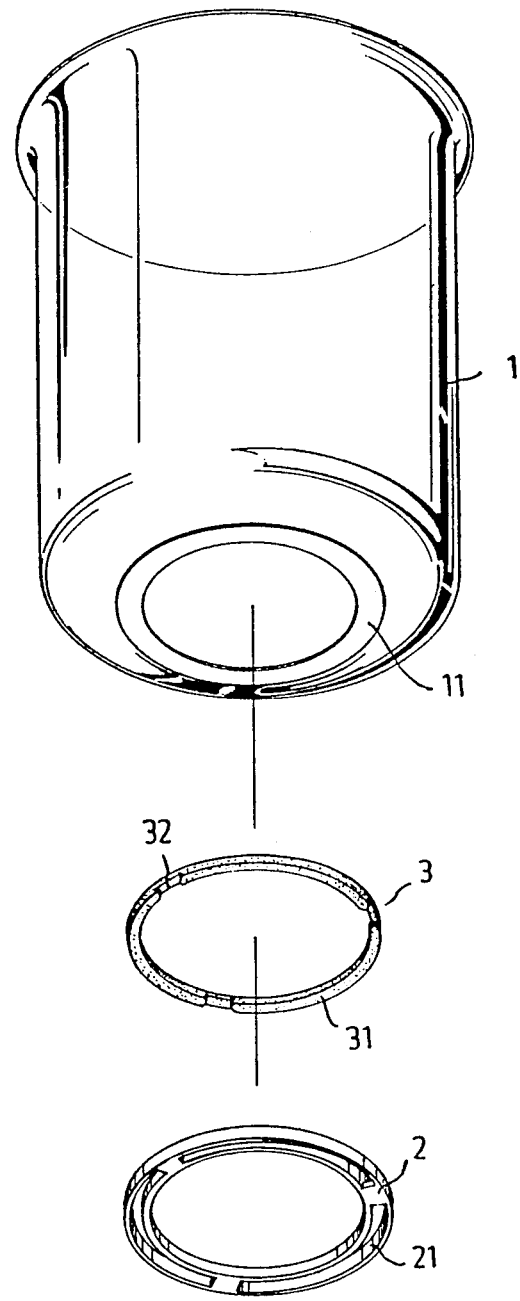
FIG. 1 is a perspective, elevational, exploded view of an anti-slip container in accordance with the present invention.

The present invention can be more fully appreciated by reference to the following detailed description, in which like numerals refer to like portions thereof. Referring first to FIG. 1, it can be seen that the present invention primarily comprises a plastic glass, 1, having a conventional glass- or cup-shaped configuration, a support member or ring base, 2, and an anti-slip member or band, 3. The base of the plastic glass, 1, is provided with a ring-shaped groove, 11. The ring base, 2, is provided in alignment with the groove, 11, and the ring base, 2, including a plurality of circumferential slots 21. The anti-slip band, 3, is made of polyvinyl chloride (PVC) and/or other anti-slip materials, and the anti-slip band, 3, includes a plurality of flanges, 31, and notches, 32. These flanges, 31, and notches 32, are in alignment with the circumferential slots, 21, of the ring base, 2.

Figure 2:
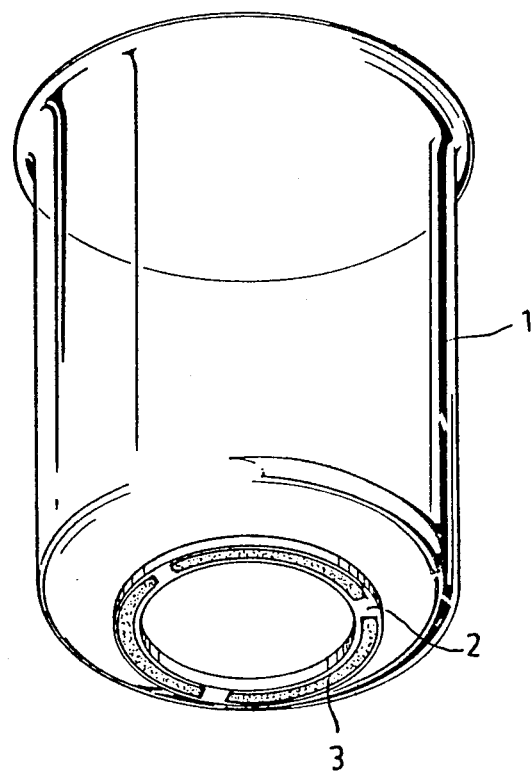
FIG. 2 is a perspective, elevational, composite view of the anti-slip container shown in the exploded view in FIG. 1.
Figure 3:
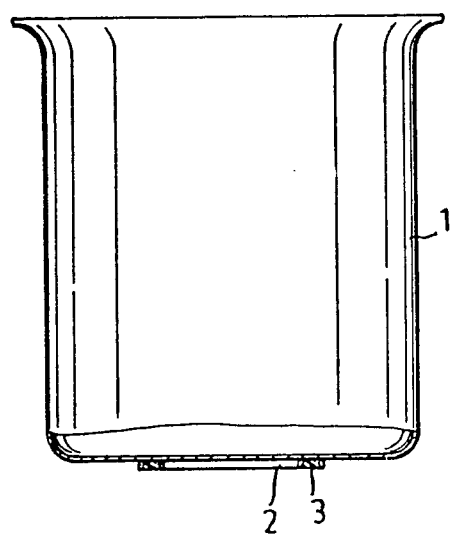
FIG. 3 is a front, elevational, partially cross-sectional view of the anti-slip container shown in FIG. 2.
Figure 4:
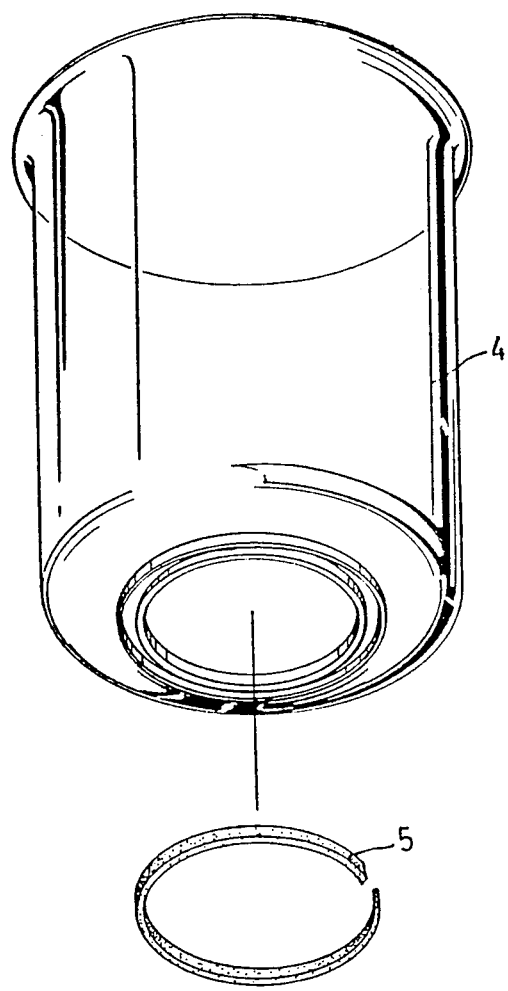
FIG. 4 is a perspective, elevational, exploded view of the conventional anti-slip structure.

Referring next to FIGS. 2 and 3, it can be seen that the anti-slip container of this invention is assembled by inserting the flanges, 31, and the notches, 32, of the anti-slip band, 3, into the circumferential slots, 21, of the ring base, 2. Thereafter the aforesaid structure can be engaged or affixed to the groove, 11, of the plastic glass, 1, by ultra-sonic waves. By doing so, a rigid structure can thus be ensured.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. An anti-slip container comprising a container including a base portion for supporting said container on a surface, groove means disposed in said base portion, a support member having a shape corresponding to the shape of said groove means whereby said support member can be disposed within said groove means, and an anti-slip member having a shape corresponding to said shape of said support member and having a size such that said anti-slip member can be retained between said support member and said groove means, said support member including aperture means and retention means at least partially blocking said aperture means, whereby at least a portion of said anti-slip member can project through said aperture means when said anti-slip member is retained between said support member and said groove means while said retention means can prevent the removal of said anti-slip member from said support member therethrough.

2. The anti-slip container according to claim 1 wherein said groove means, said support member, and said anti-slip member each has a generally annular configuration.

3. The anti-slip container according to claim 1 wherein said container has a cup-shaped configuration.

4. The anti-slip container according to claim 1 wherein said aperture means in said support member comprises a plurality of circumferential slots.

5. The anti-slip container according to claim 4 wherein said retention means comprises a plurality of bridging members separating said plurality of circumferential slots from each other.

6. The anti-slip container according to claim 5 wherein said anti-slip member includes a plurality of notches corresponding in location to the location of said plurality of bridging members.

7. The anti-slip container of claim 1 wherein said container comprises a plastic container.

8. The anti-slip container according to claim 1 wherein said anti-slip member and said support member are engaged to said groove means in said container by means of application of ultrasonic waves thereto.

9. The anti-slip container according to claim 1 wherein said anti-slip member comprises polyvinyl chloride.

* * * * *